United States Patent
Yerramalli et al.

(10) Patent No.: US 10,694,493 B2
(45) Date of Patent: Jun. 23, 2020

(54) PAGING AND DRX ENHANCEMENTS FOR EMTC-U (IOT-U)

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/043,023

(22) Filed: Jul. 23, 2018

(65) Prior Publication Data
US 2019/0028999 A1 Jan. 24, 2019

Related U.S. Application Data

(60) Provisional application No. 62/536,319, filed on Jul. 24, 2017.

(51) Int. Cl.
*H04W 8/24* (2009.01)
*H04W 68/00* (2009.01)
(Continued)

(52) U.S. Cl.
CPC .......... *H04W 68/02* (2013.01); *H04B 1/7143* (2013.01); *H04W 52/0225* (2013.01); *H04B 1/713* (2013.01); *H04W 4/70* (2018.02)

(58) Field of Classification Search
CPC ... H04W 76/28; H04W 68/02; H04W 68/005; H04W 52/0216; H04W 4/70; H04W 68/00; H04W 52/02; Y02D 70/24; Y02D 70/21
See application file for complete search history.

(56) References Cited

U.S. PATENT DOCUMENTS

2013/0077554 A1* 3/2013 Gauvreau ............... H04L 5/001 370/312
2016/0057731 A1* 2/2016 Damnjanovic ..... H04W 68/005 455/458
(Continued)

OTHER PUBLICATIONS

"3 Generation Partnership Project, Technical Specification Group Radio Access Network, Evolved Universal Terrestrial Radio Access (E-UTRA), User Equipment (UE) procedures in idle mode (Release 14)", 3GPP Standard, Tecnical Specification, 3GPP TS 36.304, 3rd Generation Partnership Project (3GPP), Mobile Competence Centre, 650, Route Des Lucioles, F-06921, Sophia-Antipolis Cedex, France, vol. RAN WG2, No. V14.3.0, Jun. 23, 2017 (Jun. 23, 2017), XP051299013, pp. 1-49, [retrieved on Jun. 23, 2017] Paragraph [0007] —Paragraph [07.3].

(Continued)

*Primary Examiner* — Gary Lofantant
(74) *Attorney, Agent, or Firm* — Norton Rose Fulbright LLP

(57) ABSTRACT

Certain aspects of the present disclosure relate to methods and apparatus for monitoring paging occasions. In one example, a mobile communication device defines a paging frame window (PFW) for a duration of time on a hop frequency or narrow band of frequencies indicated by a paging formula, and periodically wakes up to monitor the PFW for a page message. In another example, the mobile device receives a frame structure information at the start of a frame.

30 Claims, 12 Drawing Sheets

(51) Int. Cl.
*H04W 68/02* (2009.01)
*H04W 52/02* (2009.01)
*H04B 1/7143* (2011.01)
*H04B 1/713* (2011.01)
*H04W 4/70* (2018.01)

(56) References Cited

U.S. PATENT DOCUMENTS

2016/0286385 A1* 9/2016 Ryu .................. H04W 76/28
2019/0069192 A1* 2/2019 Palenius ............ H04W 24/10

OTHER PUBLICATIONS

"3rd Generation Partnership Project; Technical Specification Group Services and System Aspects; Study on system impacts of extended Discontinuous Reception (DRX) cycle for power consumption optimization (Release 13)", 3GPP Standard, 3GPP TR 23.770, 3rd Generation Partnership Project (3GPP), Mobile Competence Centre, 650, Route Des Lucioles, F-06921 Sophia-Antipolis Cedex, France, vol. SA WG2, No. V13.0.0, Sep. 21, 2015 (Sep. 21, 2005), XP050996025, pp. 1-42, [retrieved on Sep. 21, 2005] paragraph [04.1] —paragraph [5.3.1].

Ericsson et al: "Extended DRX in Idle", 3GPP Draft, SA WG2 Meeting #109, S2-152102_WAS1922_MERGED1602AND1762 S2_109_TD_I_EDRXNEW, 3rd Generation Partnership Project (3GPP), Mobile Competence Centre, 650,Route Des Lucioles, F-06921 Sophia-Antipolis Cedex, FR, vol. SA WG2. No. Fukuoka, Japan, 20150525-20150529, May 29, 2015 (May 29, 2015), XP050982922, pp. 1-6, Retrieved from the Internet: URL: http://www.3gpp.org/ftp/tsg_sa/WG2_Arch/TSGS2_109_Fukuoka/Docs/ [retrieved on May 29, 2015 ] the whole document.

Fujitsu: "SFN Extension Vs Timer Based Solution for Extended Idle DRX Cycle", 3GPP Draft,3GPP TSG-RAN WG2 Meeting#91,R2-153108 SFN Extension Vs Timer Based Solution for Extended Idle ORX Cycle, 3rd Generation Partnership Project (3GPP), Mobile Competence Centre, 550, Route Des Lucioles, F-96921 Sophia, vol. Ran WG2, No. Beijing, China, 20150824-20150828, Aug. 14, 2015 (Aug. 14, 2015), XP050991495, pp. 1-5, Retrieved from the Internet: URL: http://www.3gpp.org/ftp/tsg_ran/WG2_RL2/TSGR2_91/Docs/ [retrieved on Aug. 14, 2015] the whole document.

Intel Corporation: "Extending DRX Cycle Impacts and Solutions for Idle Mode", 3GPP Draft, 3GPP TSG RAN WG2 Meeting #90, R2-152172 I-EDRX Impacts and Solutions, 3rd Generation Partnership Project (3GPP), Mobile competence centre, 650, Route des lucioles, F06921 Sophia-Antipolis Cedex, France vol. Ran WG2, No. Fukuoka, Japan, 20150525-20150529, May 24, 2015 (May 24, 2015), XP050972636, 6 Pages, Retrieved from the Internet: URL: http://www.3gpp.org/ftp/Meetings_3GPP_SYNC/RAN2/Docs/ [retrieved on May 24, 2015] the whole document.

International Search Report and Written Opinion—PCT/US2018/043523—ISA/EPO—dated Jan. 22, 2020.

Qualcomm Incorporated et al: "Design Considerations for Extended DRX in LTE", 3GPP Draft, 3GPP TSG-RAN WG2 Meeting #90bis, R2-152342 EDRX Design, 3rd Generation Partnership Project (3GPP), Mobile Competence Centre, 650, Route Des Lucioles, F-06921 Sophia-Antipolis Cedex, France, vol. RAN WG2. No. Fukuoka, Japan, 20150525-20150529, May 24, 2015 (May 24, 2015), XP050969430, pp. 1-6, Retrieved from the Internet: URL: http://www.3gpp.org/ftp/Meetings_3GPP_SYNC/RAN2/Docs/ [retrieved on May 24, 2015] the whole document.

\* cited by examiner

PAGING AND DRX ENHANCEMENTS FOR EMTC-U (IOT-U)

PRIORITY CLAIMS

This application claims priority to and the benefit of U.S. Provisional Patent Application No. 62/536,319 filed in the United States Patent and Trademark Office on Jul. 24, 2017, the entire content of which is incorporated herein by reference as is fully set forth below in its entirety and for all applicable purposes.

INTRODUCTION

The following relates generally to enhancements to a paging procedure used in eMTC unlicensed. Also, to improve performance of devices with infrequent communications, techniques for paging during extended discontinuous reception are disclosed. One or more techniques presented herein may improve the reliability of paging operations for UEs used in eMTC unlicensed.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE may establish a discontinuous reception (DRX) mode where it may periodically power up a radio to receive signals. The UE may power down a radio between DRX on durations to conserve power. With a DRX cycle configured, the terminal monitors the downlink control signaling only in one subframe per DRX cycle, sleeping with the receiver circuitry switched off in the remaining subframes. In DRX the UE may save power by not monitoring the PDCCH in a given subframe.

Based on the eDRX configuration, the UE may wake up during periodic subframes to monitor for control channels (e.g., a primary downlink control channel (PDCCH)) for paging messages.

SUMMARY

A method and apparatus for monitoring paging occasions is described. The method may include defining a paging frame window (PFW) for a duration of time on a hop frequency or narrow band of frequencies indicated by a paging formula, and periodically waking up to monitor the PFW for a page message.

In addition, the PFW may be monitored for a duration of a dwell time per hop on each frequency.

Furthermore, the PFW may be monitored for a duration of N frames.

Furthermore, wherein the formula used to select the hop frequency is the formula used to calculate a paging frame, where at least one bit is ignored.

Furthermore, the formula used to select the hop frequency is SFN mod T=(T/N)*(UE_ID mod N), where at least one bit is ignored.

Furthermore, a frame structure may be signaled to apparatus at the start of a frame, wherein one frame of one hop frequency has at least one downlink-uplink (DL-UL) transition.

Furthermore, the paging occasions may be monitored over a narrow band of frequencies.

Furthermore, all the downlink (DL) subframes in each DL portion of a frame may be monitored for paging occasions.

Furthermore, at least one additional high priority message may be added to the paging message.

Also, a wireless communication device for monitoring paging occasions is described. The apparatus may include a memory, a radio frequency (RF) resource, and a processor coupled to the memory and the RF resource, the processor configured to define a paging frame window (PFW) for a duration of time on a hop frequency or a narrow band of frequencies indicated by a paging formula and periodically waking up to monitor the PFW for a page message.

A non-transitory computer readable medium for monitoring paging occasions is described. The non-transitory computer-readable medium may include instructions to cause a processor to define a paging frame window (PFW) for a duration of time on a hop frequency or narrow band of frequencies indicated by a paging formula, and periodically wake up to monitor the PFW for a page message.

An wireless communication device for monitoring paging occasions is also described. The apparatus may include a means for defining a paging frame window (PFW) for a duration of time on a hop frequency or narrow band of frequencies indicated by a paging formula, and means for periodically waking up to monitor the PFW for a page message.

DETAILED DESCRIPTION

A wireless device may switch between using a short discontinuous reception (DRX) cycle to enable the efficient use of battery power and reduce latency for latency sensitive data. With a DRX cycle is configured, the terminal monitors the downlink control and data signaling in less than all the subframes per DRX cycle, sleeping with the receiver circuitry switched off in the remaining subframes. After a radio resource control (RRC) connection has been established between a base station and a user equipment (UE), a UE may enter a sleep state when not actively communicating. The DRX cycle may determine how frequently the UE wakes up to receive DL data or transmit UL data. The UL and DL data may include control signaling, user data, or both. Other type of signaling used in addition to RRC includes Layer 2 signaling.

Aspects of the disclosure are initially described in the context of a wireless communication system. Aspects of the disclosure are then illustrated by and described with reference to apparatus diagrams, system diagrams, and flowcharts that relate to receiving on transmit and transmitting on receive.

Figure 1:
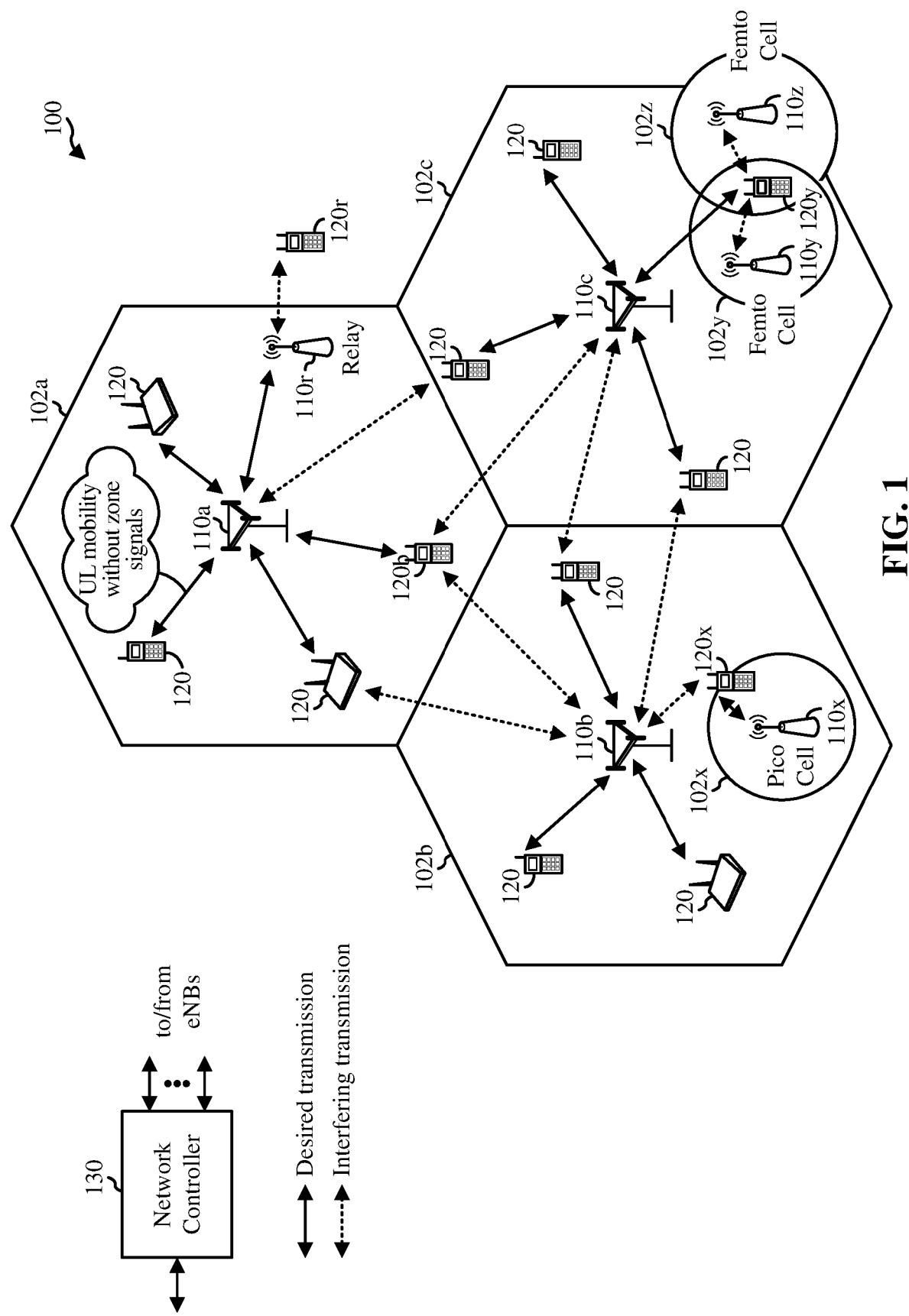
FIG. 1 is a block diagram conceptually illustrating an example telecommunications system, in accordance with certain aspects of the present disclosure.

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS 110 may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station 120. In some examples, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs in a Closed Subscriber Group (CSG), UEs for users in the home, etc.). A BS 110 for a macro cell may be referred to as a macro BS 110. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE 120 may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or enhanced MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

Figure 6:
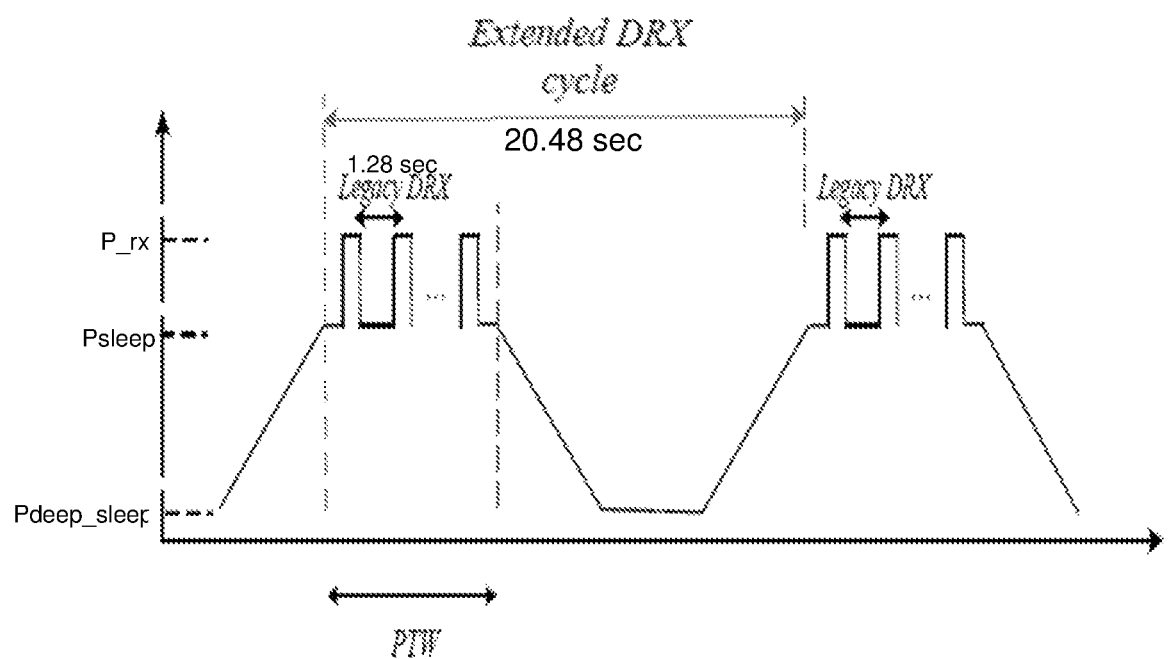
FIG. 6 illustrates an exemplary timeline for the use of eDRX with legacy DRX.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP), or gNB) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
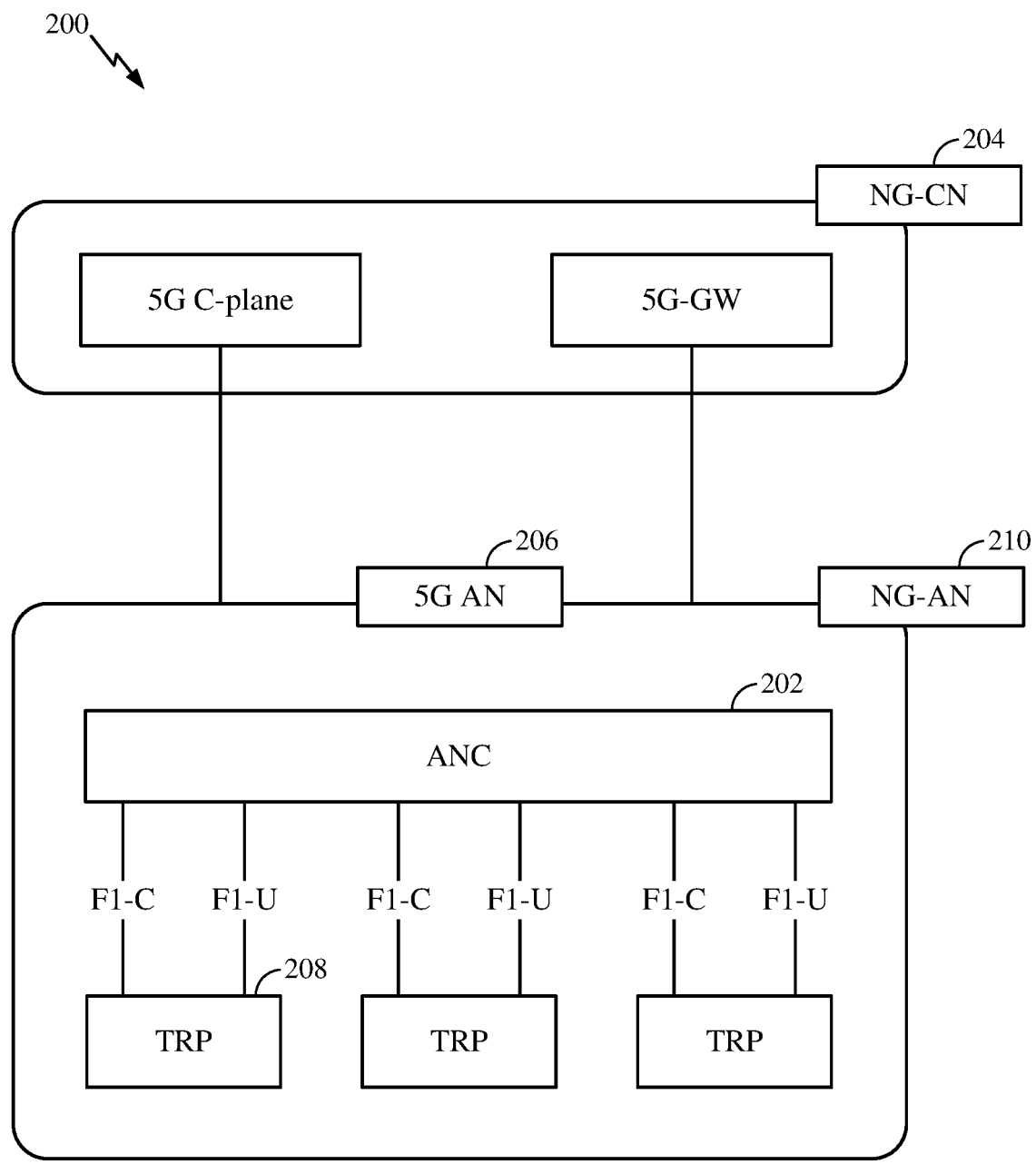
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell." In wireless communications system 100, UE 120 may use a DRX cycle to enable the efficient use of battery power. After a radio resource control (RRC) connection has been established between a gNB (which may also be referred to as BSs, NR BSs, Node Bs, 5G NBs, APs, or some other term) 110 and a UE 120, the UE 120 may enter a sleep state when not actively communicating. The DRX cycle may determine how frequently UE 120 wakes up to check for incoming transmissions, such as paging messages, scheduling information, and data.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
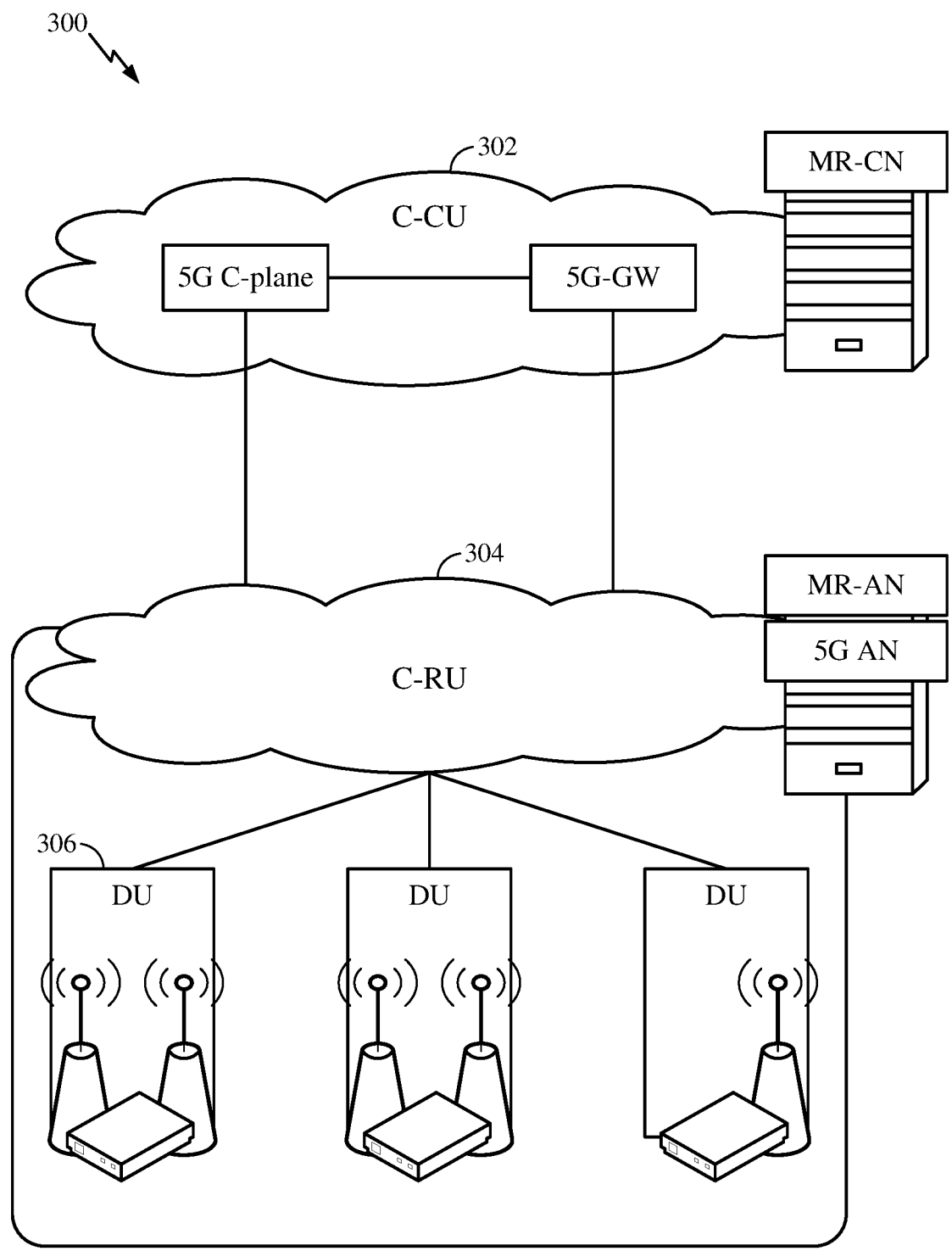
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
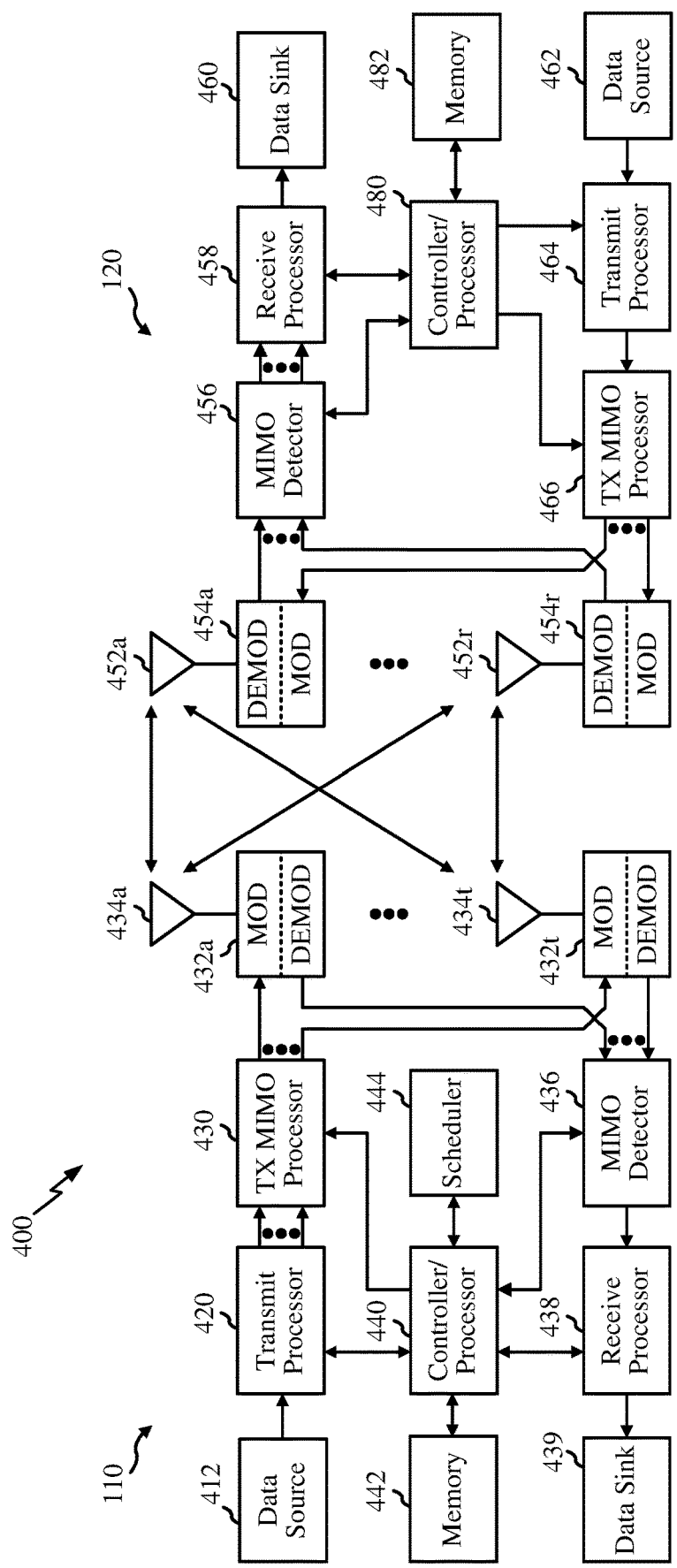
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 6-12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5A:
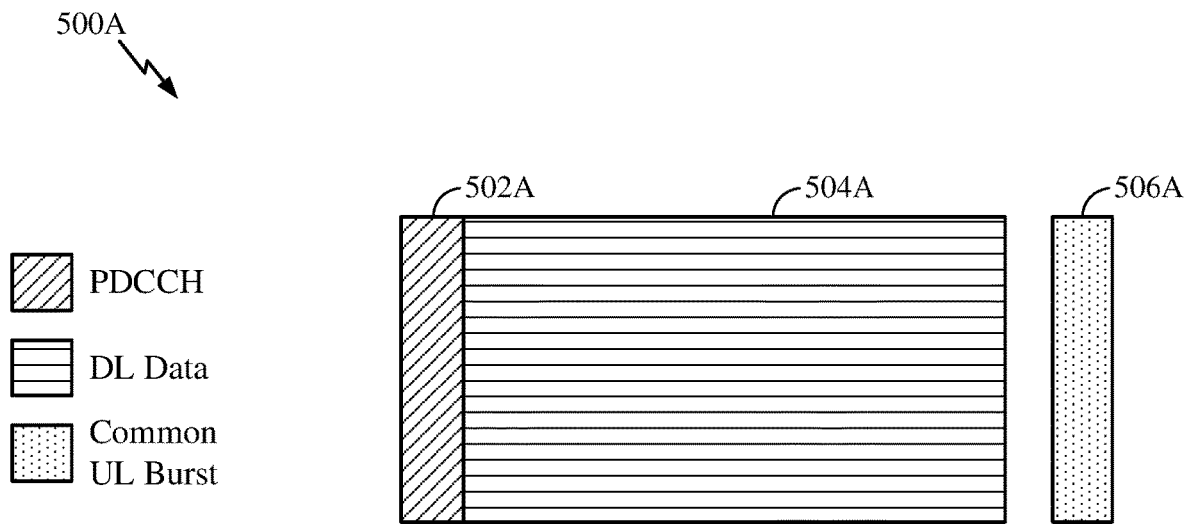
FIG. 5A is a diagram illustrating an example of a downlink (DL)-centric subframe according to some aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity 202 (e.g., eNB, UE, BS, Node B, 5G NB, TRP, etc.) to the subordinate entity 204 (e.g., UE). In some configurations, the DL data portion 504A may be a physical DL shared channel (PDSCH). The DL-centric subframe may also include a common UL portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506 may include feedback information corresponding to the control portion 502A. Non-limiting examples of feedback information may include an ACK signal, a NACK signal, a HARQ indicator, and/or various other suitable types of information. The common UL portion 506A may include additional or alternative information, such as information pertaining to random access channel (RACH) procedures, scheduling requests (SRs), sounding reference signals (SRS) and various other suitable types of information. As illustrated in FIG. 5A, the end of the DL data portion 504A may be separated in time from the beginning of the common UL portion 506A. This time separation may sometimes be referred to as a gap, a guard period, a guard interval, and/or various other suitable terms. This separation provides time for the switchover from DL communication (e.g., reception operation by the subordinate entity 204 (e.g., UE)) to UL communication (e.g., transmission by the subordinate entity 204 (e.g., UE)). One of ordinary skill in the art will understand, however, that the foregoing is merely one example of a DL-centric subframe and alternative structures having similar features may exist without necessarily deviating from the aspects described herein.

Figure 5B:
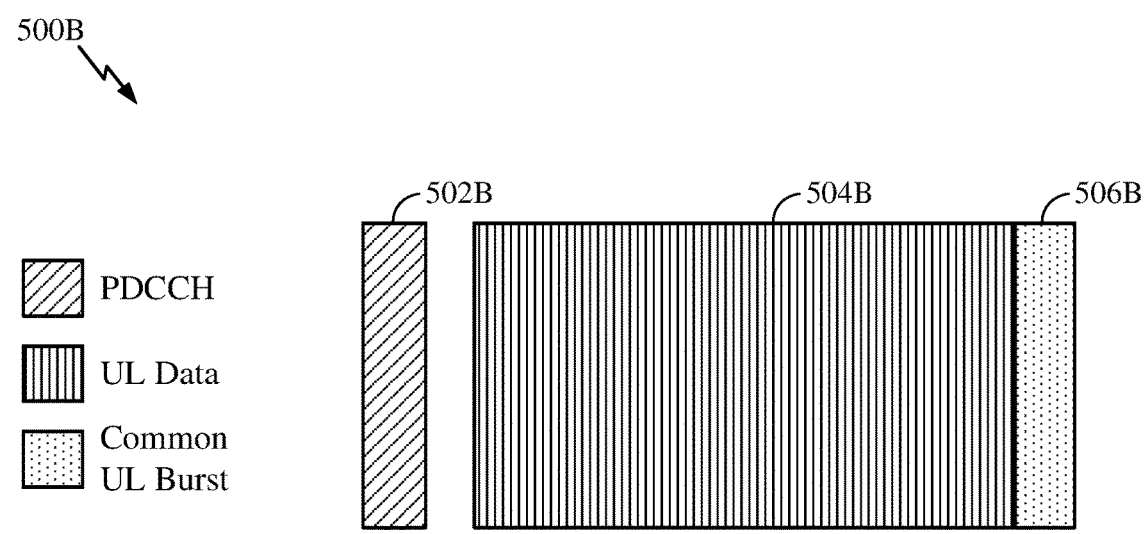
FIG. 5B is a diagram illustrating an example of an uplink (UL)-centric subframe according to some aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity 204 (e.g., UE) to the scheduling entity 202 (e.g., eNB). In some configurations, the control portion 502B may be a physical UL shared channel (PUSCH). As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switchover from DL communication (e.g., reception operation by the scheduling entity 202 (e.g., UE)) to UL communication (e.g., transmission by the scheduling entity 202 (e.g., UE)). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein. In summary, a UL centric subframe may be used for transmitting UL data from one or more mobile stations to a base station, and a DL centric subframe may be used for transmitting DL data from the base station to the one or more mobile stations. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

eMTC-U Paging Enhancements

In standby mode, any radio including a frequency hopping radio sleeps most of the time. However, it may "wake up" periodically to listen on a certain hop channel for a page message. The hop channel chosen may be different at each wake-up instant depending on the periodocity of the wake up procedure. A different hop frequency may also provide resistance against jammers. In addition to addressing interference, frequency hopping is required to satisfy some regulatory requirements for operating in the unlicensed spectrum. The present method and apparatus focuses on paging with eMTC. The term MTC generally applies to a broad class of devices in wireless communications including, but not limited to: Internet of Things (IoT) devices, Internet of Everything (IoE) devices, wearable devices and low cost devices.

The network configures in which subframes a terminal should wake up and listen for paging messages. Typically, the configuration is UE specific, although there is a possibility to complement the setting by using a cell-specific configuration in some scenarios. The duration of the paging cycle is also a function of the QoS that needs to be ensured for a given UE. When it is not connected to an eNB, a UE is said to be in IDLE mode. However, the network still keeps track of the UE by use of a paging mechanism. After the initial power-on sequence, the UE will perform limited functionality in IDLE mode which may save battery power. For DL traffic the UE is paged, but for UL traffic the UE will move to the connected state and will no longer be in an IDLE state. During IDLE mode, the UE remains in the sleep mode defined in an idle-DRX cycle. In RRC Idle mode, the UE checks for paging messages once every DRX cycle. Thus, paging may be used by the network to establish a connection with the UE. A default DRX cycle is broadcast within System Information Block 2 (SIB2). A paging frame in an enhanced MTC (eMTC) is defined as the specific radio frame in which UE checks a paging message. It may contain one or multiple Paging Occasion(s). In LTE two timing units are used for paging: a System Frame Number (SFN) and a Subframe Number (SN). To locate an exact position in the LTE time domain, both the SFN and SN are used. In LTE, the SFN (System Frame Number) moves in 10 ms intervals and has numbers between 0 and 1023, while the subframe number moves in 1 ms intervals and has numbers between 0 and 9. When a subframe number hits the max value (i.e., 9), it goes back to 0 and the SFN number gets increased by 1. When the SFN number hits the max value (i.e., 1023), it goes back to 0.

The UE and the eNB maintain the synchronization on the subframe number (SN) and the System Frame Number (SFN) during the whole communication period. In which frame a given terminal should wake up and search for the P-RNTI on a PDCCH is determined by an equation taking as input the identity of the terminal as well as a cell-specific and (optionally) a UE-specific paging cycle. The paging cycle for a terminal can range from once per 256 frames up to once per 32 frames. Not all 1 ms subframes within the paging frames are checked by a UE. A UE does not check all the subframes within the paging frame, but only checks for paging occasions (PO). That is, those subframes identified by a paging occasion are checked. A UE monitors the PDCCH for paging indications while in RRC Idle mode. It checks for the P-RNTI belonging to the subframe indicated by the paging occasion (PO). In LTE a paging occasion (PO) refers to the subframe addressed to the P-RNTI. In LTE eMTC or NB-IoT or other RATs which may use coverage extension, the paging occasion (PO) refers to the first subframe at which the UE starts monitoring for paging. The UE is triggered to decode the paging message from the relevant PDSCH resource blocks when it receives a positive paging indication on the PDCCH. Paging messages may be transmitted in some subframes. In a first example, a paging message may be transmitted one subframe per 32 frames. In another example, there may be paging in four subframes in every frame.

A paging frame (PF)=SFN mod T=(T/N)×(UE_ID mod N) where T is defined as follows: T is the paging-DRX cycle of the UE (up to 256 radio frames). T is determined by the shortest of the UE specific DRX value, if allocated by upper layers, and a default DRX value is broadcast in system information, i.e., in SIB 2. If UE specific DRX is not configured by upper layers, the default value is applied. This means UE can get the T from two different sources, one from the system information (SIB2, IE defaultPagingCycle) and the one from an upper layer. The value chosen depends on whether an upper layer sends a value. If the upper layer sends the value, the value from the upper layer is used. Otherwise UE uses the value from SIB2.

The other values are defined as follows.

N=min (T, nB) means the smaller one among T and nB, where nB is broadcast in SIB2 and can be any one of 4T, 2T, T/2, T/4, T/8, T/16, T/32, T/64, T/128, T/256.

UE_ID=IMSI mod 1024 (in LTE), and IMSI mod 16384 (in eMTC), where IMSI is the International Mobile Subscriber Identity. An International Mobile Subscriber Identity (IMSI) is a unique identification associated with all GSM, UMTS and LTE network mobile phone users. Since different terminals have different IMSI, they will compute different paging instances.

In one example, for UE_ID=51, N=T/4, T=32 frames then SFN=12, 44, 76 . . . . This represents an offset of 32. So the UE wakes up every 32 frames to monitor for a paging occasion.

A paging occasion in LTE is extracted from a look up table, where the values in the table are defined as follows: Ns=Max (1,nB/T), i.e., Ns is the larger value between 1, and NB/T and i_s=Floor(UE_ID/N) mod Ns. Based on the value of Ns and i_s, the subframe on which to look for paging is defined. The paging narrowband (PNB)=floor(UE-ID/(N*Ns)) mod Nn, where Nn=a number of narrowbands within the eNB wideband. Section 7.2, subframe patterns, of TS36.304 v. 14.3.0 (2017-06) discloses four such tables as shown below:

FDD:
   If P-RNTI is transmitted on PDCCH or NPDCCH, or if P-RNTI is transmitted on MPDCCH with system bandwidth>3 MHz:

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

If P-RNTI is transmitted on MPDCCH with system bandwidth of 1.4 MHz and 3 MHz:

| Ns | PO when i_s = 0 | PO when i_s = 1 | PO when i_s = 2 | PO when i_s = 3 |
|---|---|---|---|---|
| 1 | 5 | N/A | N/A | N/A |
| 2 | 5 | 5 | N/A | N/A |
| 4 | 5 | 5 | 5 | 5 |

TDD (all UL/DL Configurations):
   If P-RNTI is transmitted on PDCCH, or if P-RNTI is transmitted on MPDCCH with system bandwidth>3 MHz:

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

If P-RNTI is transmitted on MPDCCH with system bandwidth of 1.4 MHz and 3 MHz:

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Paging narrowband (PNB) is one narrow band of frequencies in which the UE performs paging reception and is determined by a UE-ID and the number of narrowbands used for paging. The eNB may use different narrowbands of frequency for sending paging messages. The eNB can signal to the UE its frequency hopping pattern. Regarding the paging cycle, the PF (Paging Frame) and PO (Paging Occasion) are used to indicate the exact timing when a UE has to wake up to catch the paging message being sent to it. The longest time span for the timing synchronization without resetting to 0 is 1023 SFN. It is 1024×10 ms, which is 10240 ms (=10240 subframe=10.24 sec). Most of timing related parameters (e.g, Idle mode DRX, Connected Mode DRX, BSR Report period etc.) are configured within this max timing value.

eDRX is one of the enhancements to be introduced in long term evolution (LTE) release 13 (Rel 13). eDRX may enable a significantly higher power savings than what is possible in current DRX, especially for machine type communications (MTC) devices with low data activity. Legacy (e.g., current) DRX is constrained to the system frame number (SFN) range, which is currently 0 to 1023 in LTE. The extended Discontinuous Reception (eDRX) feature allows IoT devices to remain inactive for longer periods than T_DRX. This feature allows the device to connect to a network on a need basis. Many times the IoT devices are installed at places without a power supply. Consequently, they may run completely on a battery. For example, as will be described in detail below, the techniques may be used by certain devices, such as enhanced MTC (eMTC) devices, to perform eDRX with cycle lengths of forty minutes or more, rather than being constrained to a maximum cycle length based on the SFN range of 1024 frames or 10.24 seconds, as in current DRX. Past 1024 frames, you roll over the system frame number. According to aspects of the present disclosure, a wireless communication system may index each cycle of 1024 radio frames (e.g., an SFN cycle) with one hyper SFN (H-SFN). Multiples of the SFN 0f 1024 frames may be kept track of. The H-SFN may, for example, have a range of 0 through 255 SFN cycles which extends the range by 8 bits, where 28=256. eNBs of a wireless communication system may broadcast the H-SFN in a system information block (SIB). According to aspects of the present disclosure, a wireless communication system may assign one or more paging hyper-frames (PHs) to a UE operating using DRX thereby extending the sleep time for the UE between DRX cycles. It does this by separating paging time windows (PTW) comprising multiple legacy DRX cycles by an extended DRX cycle (T_eDRX). See FIG. 6 which shows the use of extended DRX cycle with a paging time windows (PTW) comprising multiple legacy DRX cycle. In this example, PTWs with 3 legacy DRX cycles of up to 1.28 seconds each are separated by an extended DRX cycle (T_eDRX) of 2 hyperframes of 10.24 sec=20.48 seconds. This is helpful for reducing the power drain on devices which do not need to be woken often which can save battery power. With an improvement to DRX the network knows how many "hyper frames" (HF) of 10.24 seconds the UE would like to sleep before checking back in. The maximum number of HFs a UE may sleep is settable by the mobile network operator. An SFN of 1024 frames is equal to one hyperframe of 10.24 seconds.

A normal LTE paging cycle is 1.28 s If a UE is configured with an extended DRX cycle (T_eDRX) and the eDRX cycle is 512 radio frames, the UE wakes up as often as without eDRX. If the eDRX cycle is more than 512 radio frames, then the UE monitors paging within a paging time window (PTW) or until a UE NAS message is received within the PTW.

A paging hyperframe (PH) is the H-SFN which satisfies the following equation: H-SFN mod T_eDRX_H=UE_IDH mod T_eDRXH, where UE_ID_H is the 10 most significant bits of hashed-ID which is derived from S-TMSI which is the SAE-Temporary Mobile Subscriber Identity. S-TMSI may be used to identify the uE within a tracking area.

One hyper extended DRX cycle (T_eDRX_H) can be between 1 to 256 hyper frames.

"PTW_start" denotes the first radio frame of the paging hyper-frames (PHs) that is part of the PTW and satisfies SFN=256*ieDRX, where ieDRX=floor(UE_ID_H/TeDRX_H) mod 4. Here with eMTC, the paging occasion refers to the start of the subframe where a paging occasion is being searched for.

"PTW" end is the last radio frame of the PTW and has a SFN satisfying SFN=(PTW_start+L*100−1) mod 1024, where L is configured by upper layers.

MTC and/or machine-to-machine (M2M) communication may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. In many cases, MTC devices are power constrained. MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. eMTC-U supports both idle mode and extended idle mode DRX.

Proposal 1: With unlicensed spectrum, the eNB performs a "listen before talk" procedure before transmitting a paging message. If interference is detected, the eNB will not transmit. So a first suggested improvement is to define a paging frame window (PFW) for a duration of time on a hop frequency or narrow band of frequencies indicated by a paging formula and spanning a duration of N frames (configured by upper layers/signaled in NAS/RRC signaling and/or a SIB). This is to account for LBT failure at the eNB. So instead of monitoring just one frame, a window containing multiple frames may be monitored, e.g., N frames, where in one example, N can be 3-5 frames long. So no longer is the page received in one location, instead it is received in one of the frames in a window of frames because the eNB will perform listen before talk before when transmitting in unlicensed spectrum and may not have access to the medium for all the time. The use of a window allows the eNB more space to transmit the paging message in a frame. So the UE will be awake for a slightly longer period of time than when monitoring one frame. Proposal 2: The paging frame formula is modified to uniquely map to a hop frequency and not a radio frame for a given instance. The frequency is a carrier frequency which hops among those found within a narrow band of frequencies. In one example, the UE hops frequencies over an 80 GHz bandwidth in the 2.4 GHz band. In another example, the narrow band of frequencies falls between 2.4 GHz to 2.48 GHz. In addition, the hopping pattern could be random. So one time the carrier frequency is at the edge of the 2.4 GHz band and then somewhere else within the band on subsequent hops. Using the formula to calculate a paging frame, SFN mod T=(T/N)*(UE_ID mod N), but ignoring the last 3 bits can be used to identify the hop frequency used for paging when an 80 ms frame is assumed. If a 40 ms frame is assumed, then UE ignores the last 2 bits. In an alternate mechanism, the paging frame can be mapped to a fixed hop frequency as a function of the UE-ID. For example, if SFN mod T=(T/N)*(UE_ID mod N) equals 001100, and the last 3 bits are removed (or set to zero), then a binary representation of SFN ID equals 001000 is produced and the SFN ID of 001100 maps to a hop frequency.

At each hop frequency, multiple radio frames could be monitored. (For example, during an 80 ms frame duration, 8 radio frames can be monitored, where one frame is 10 msec long.) So at each hop frequency, a multiple number of frames, N, may be monitored for a paging occasion.

Unlike LTE, the frame structure for eMTC changes over the frame and the frame length can vary. Typically, an eMTC frame can be 20 msec to 80 msec long, Also, the first 10 msec of the frame may not look like the next 10 msec because the frame structure may be dynamic. For example, the first 10 msec may have 6 UL subframes and 4 DL subframes, while the next 10 msec may have 2 UL subframes and 8 DL subframes. In addition, within each eMTC frame, each hop frequency could either have a single DL-UL transition or multiple DL-UL transitions. This frame structure information may be signaled to the UE at the start of each frame by the eNB on that hop frequency. So the UE looks at what hop frequency the radio frame it wants to monitor lies in and then wakes up when the eNB is expected to start transmitting on that hop frequency.

eMTC UEs (e.g., in LTE Rel-13) supports narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). If the eNB has multiple narrowbands within a wideband transmission, two methods may be used for selecting a narrowband.

Method 1: Follow the same procedure as in LTE for identifying the narrowband. In LTE the narrowband is typically fixed, or method 2: Define a fixed narrowband to monitor paging (e.g. first narrowband).

Note: In eMTC-U, it is possible for the eNB to have a dynamic BW (1, 2 or 4 narrowbands) within each hop to change the coverage level for DL transmissions so different narrowbands may be used by the eNB to send paging messages. The frame structure signaling can indicate the number of narrowbands that may be present in each hop frequency and the UE dynamically determines the narrowband to monitor paging messages depending on the total number of narrowbands signaled for that hop frequency instance.

Proposal 3: Alternatively, instead of radio frames, paging (idle DRX) and connected DRX could be defined as multiples of dwell time per hop on each frequency.

Figure 7:
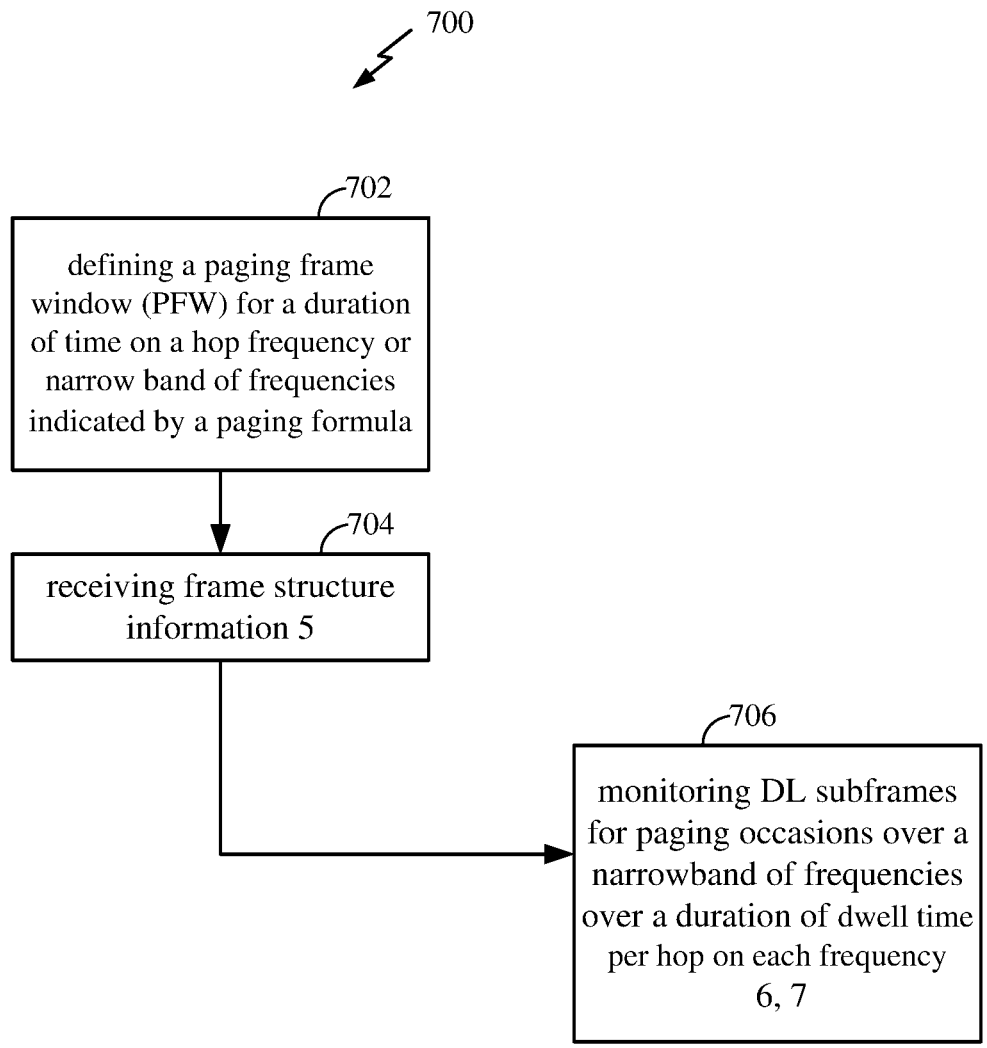
FIG. 7 is a flowchart illustrating a process 700 used for monitoring paging occasions.

FIG. 7 is a flowchart illustrating a process 700 used for monitoring paging occasions. In step 702, a paging frame window (PFW) is defined for a duration of time on a hop frequency or narrowband of frequencies indicated by a paging formula. In step 704 frame structure information is received by the UE. In step 706, DL subframes are monitored for paging messages over a narrowband of frequencies over a duration of dwell time per hop on each frequency.

Figure 8:
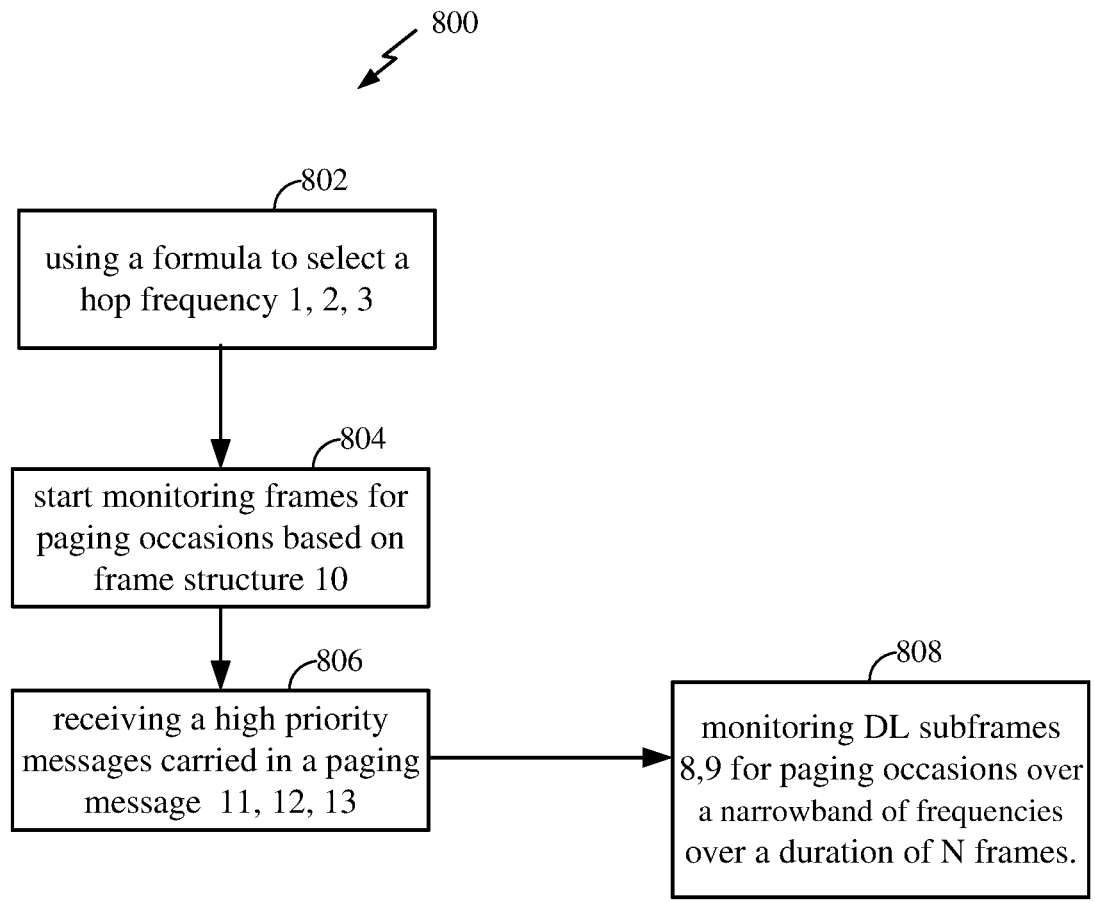
FIG. 8 is a flowchart illustrating a process 800 used for monitoring paging occasions.

FIG. 8 is a flowchart illustrating a process 800 used for monitoring paging occasions. In step 802, using a formula a hop frequency is selected. In step 804 monitoring for paging occasions based on frame structure is started. In step 806, high priority messages carried in paging messages are received. In step 808, DL frames are monitored for paging occasions over a narrowband of frequencies over a duration of N frames.

Figure 9:
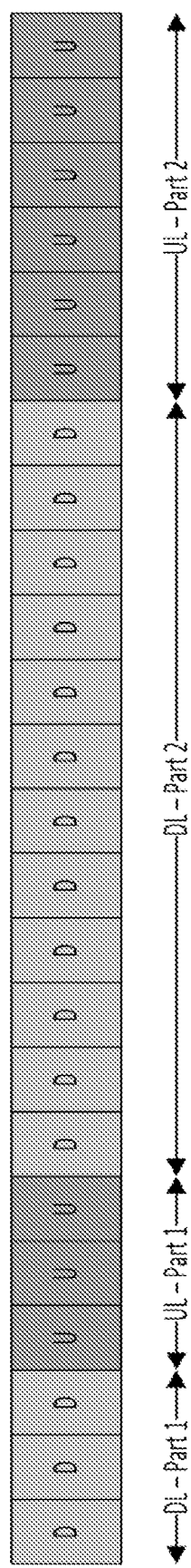
FIG. 9 discloses a frame structure number comprising multiple UL and DL subframes and multiple DL-UL transitions.

FIG. 9 discloses a frame structure number comprising multiple UL and DL subframes and multiple DL-UL transitions. Within a HOP frequency, the UE may monitor subframes for paging occasions to locate Paging-Radio Network Temporary Identifiers (P-RNTI) to which a paging message is directed. As discussed above, each hop frequency could either have a single DL-UL transition or multiple DL-UL transitions and the frame structure information may signaled to the UE at the start of each frame. The number of DL-UL transitions along with the number of UL and DL subframes may be dynamic.

One of three methods may be used to determine which subframes to monitor for paging occasions on.

Method 1: UE monitors the longest continuous DL duration within the frame for paging occasions having the P-RNTI the paging message is addressed to. The rationale is paging needs repetition because it's a coverage extended system. So repetition is used to allow all UEs to get the paging message. So here, instead of monitoring all subframes, just monitor within the longest, continuous set of DL subframes. So, for example, if the maximum number of continuous DL subframes is 10, the just monitor those 10 subframes.

Method 2: The UE monitors for paging occasions for all the DL subframes in each DL portion of the frame (depending on PDCCH search space defined for paging).

Method 3: The subframe where the UE starts monitoring paging is uniquely defined for each frame structure, i.e. for each candidate frame structure out of the set of all possible frame structures, the eNB defines a specific subframe to start monitoring for paging and the subframe could be different for different frame structures.

In one example, the UE searches for paging only in DL-Part 2 (option 1, 2) or both DL-Part 1 and Part 2 (option 3) of the frame structure. In another example, DL-Part 1 and DL-Part 2 have independent LBT at the eNB side. In another example, a PO may start in the first usable D subframe (e.g. PO can start after frame structure signaling).

The following is a comparison of cell specific vs. UE specific paging eDRX cycles. An eDRX cycle is cell specific in NB-IoT and, in contrast, is UE specific in eMTC and LTE as LTE systems in general require the network to satisfy the QoS requirements of a UE while satisfying QoS is not a consideration in NB-IoT. For eMTC deployments in the shared and unlicensed spectrum or for private network deployments, some applications or UEs may have QoS requirements and some applications or UEs may not have any requirements. This is due to the need to address a large number of use cases ranging from mission critical industrial IoT applications all the way to very latency tolerant applications.

However, an eDRX cycle is configurable for the UE (if supported). In addition, the eDRX values range from 20.48 sec to 10485.76 sec. The paging time window's (PTW) duration is between 2.56 to 40.96 sec eMTC uses a UE specific paging DRX cycle (as in LTE), while NB-IoT uses a cell specific DRX cycle.

In one example, depending on the use case, the eNB can configure either a cell-specific or a UE specific DRX or eDRX cycle. Just a few bits may be used to carry this information Both mechanisms are supported in this example.

The RRC configuration message impact—RRC config common vs. RRC dedicated config means that providing a cell specific or a UE specific configuration can be done though RRC messages. If it is cell specific configuration, the message is usually in a RRC common configuration, while if it is a UE specific message, typically it is in an RRC dedicated configuration.

A paging message typically carries a UE paging record, system modification message, and an ETWS or a CMAS indication. One improvement for eMTC-U is adding some high priority messages to be carried in the paging message. Such high priority messages may include: a change of frequency hopping list including a number of hopping channels. A change of an anchor channel information used for DRS transmissions may also be a high priority message added to the paging message. For example, you may add a message indicating that the frequency on which the discovery signal is transmitted is going to change.

In eMTC unlicensed there is an anchor channel which has a fixed frequency and is used to transmit a discovery signal. Between occupying hopping frequencies, the eNB switches to the anchor channel to transmit acquisition signals like PSS, SSS and PBCH. The transmission time on the anchor channel is very small compared to the typical duration of a hopping frame. In one example it may be 5 ms every 80 ms. The anchor channel is very helpful because less overhead is used to transmit these signals than when using the hop frequency, and more importantly, the anchor channel can reduce the frequency.

Some bits in the MIB or SIB-A (or SIB-anchor) can carry some information to enable paging the UEs or to reduce the overhead of a paging transmission.

In one example it is suggested that the eNB configures for a UE (in a SIB broadcast) a set of one or more resource configurations for paging grants such as one or more PDCCH formats for paging grants. For example:

Format 1: Resource allocation=6RB, MCS=0, Rep=4, PDSCH resource start=subframe 2 in radio frame. Format 2: Resource allocation=First 3RB, MCS=0, Rep=8 etc. And the PDCCH is no longer transmitted for paging to reduce overhead.

Figure 10:
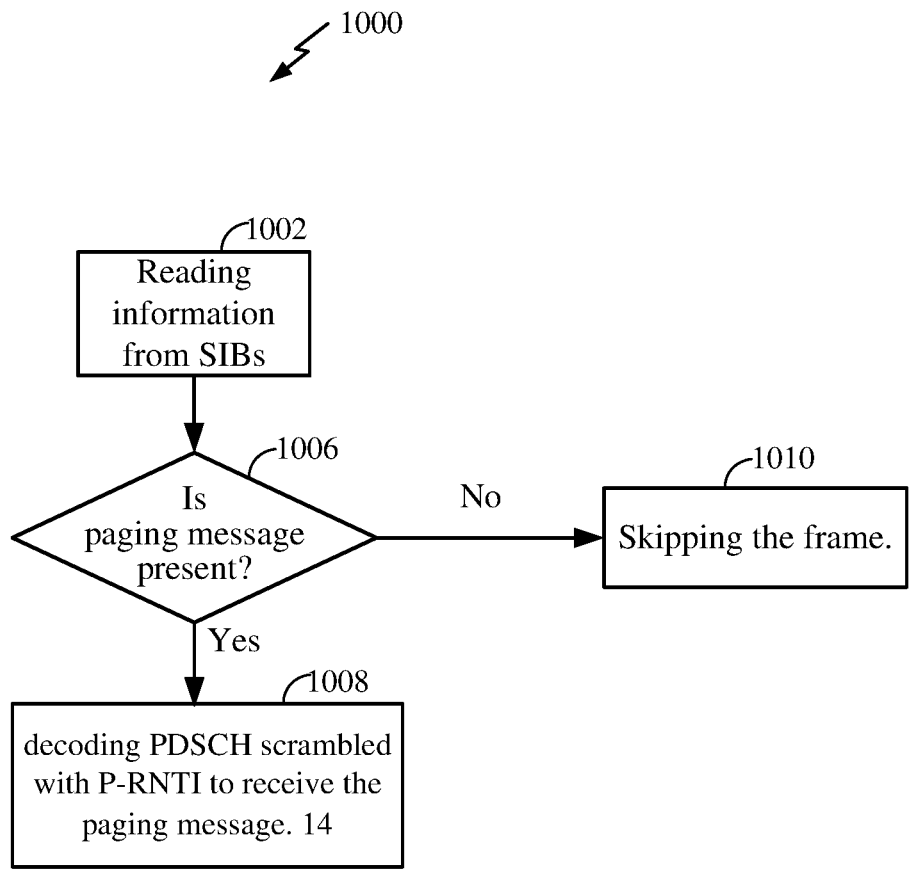
FIG. 10 is a flowchart illustrating is a process 1000 taken when a UE determines if paging information is carried on an anchor channel.

The UE reads the MIB or SIB-A which indicates (1) whether paging is present in this frame, and, if paging is present, (2) the control format for PDSCH to be assumed for paging. Using this information, the UE can directly go ahead with decoding PDSCH scrambled with P-RNTI to receive the paging message. If paging information is not indicated to be present, the UE can skip the whole frame and wait for the next paging occasion (PO). This can reduce the control overhead associated with paging in a cell in some deployments and use cases where the paging load is constant or very predictable. The flowchart in FIG. 10 illustrates the steps taken when a UE determines if paging information is carried on an anchor channel. In step 1002 a SIB is read. In step 1006, it is determined if a paging message is present. If a paging message is present, decode PDSCH scrambled with P-RNTI to receive the paging message as shown in step 1008. If no paging message is present, skip the frame as shown in step 1010.

Figure 11:
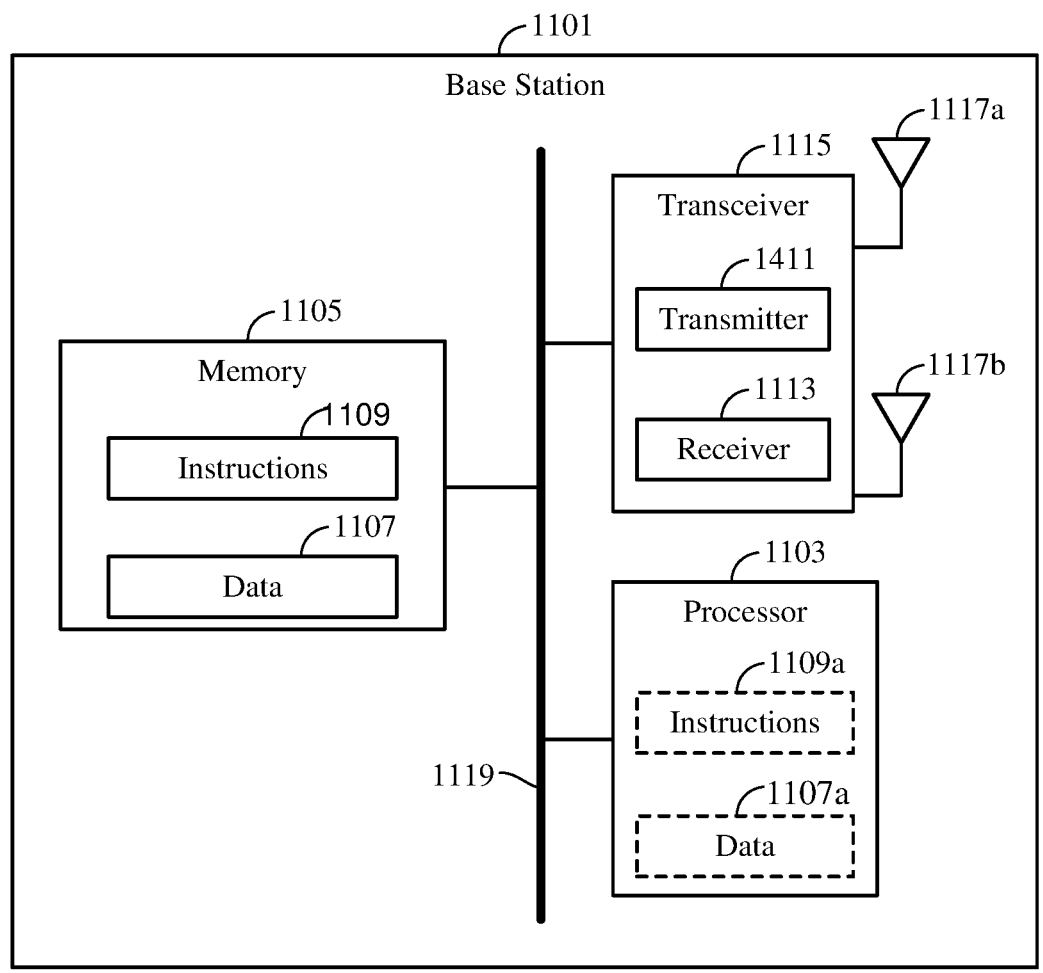
FIG. 11 illustrates certain components that may be included within a base station.

FIG. 11 illustrates certain components that may be included within a base station 1401. The base station 1101 may be an access point, a NodeB, an evolved NodeB, etc. The base station 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1101 of FIG. 11, in an alternative configuration, a combination of processors (e.g., an ARM and DSP) could be used.

The base station 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1403 to implement the methods disclosed herein. Executing the instructions 1409 may involve the use of the data 1107 that is stored in the memory 1105. When the processor 1403 executes the instructions 1109, various portions of the instructions 1109a may be loaded onto the processor 1103, and various pieces of data 1407a may be loaded onto the processor 1103.

The base station 1101 may also include a transmitter 1111 and a receiver 1113 to allow transmission and reception of signals to and from the wireless device 1101. The transmitter 1111 and receiver 1113 may be collectively referred to as a transceiver 1115. Multiple antennas 1117a-b may be electrically coupled to the transceiver 1115. The base station 1401 may also include (not shown) multiple transmitters, multiple receivers and/or multiple transceivers.

The various components of the base station 1401 may be coupled together by one or more buses, which may include a power bus, a control signal bus, a status signal bus, a data bus, etc. For the sake of clarity, the various buses are illustrated in FIG. 10 as a bus system 1419.

Figure 12:
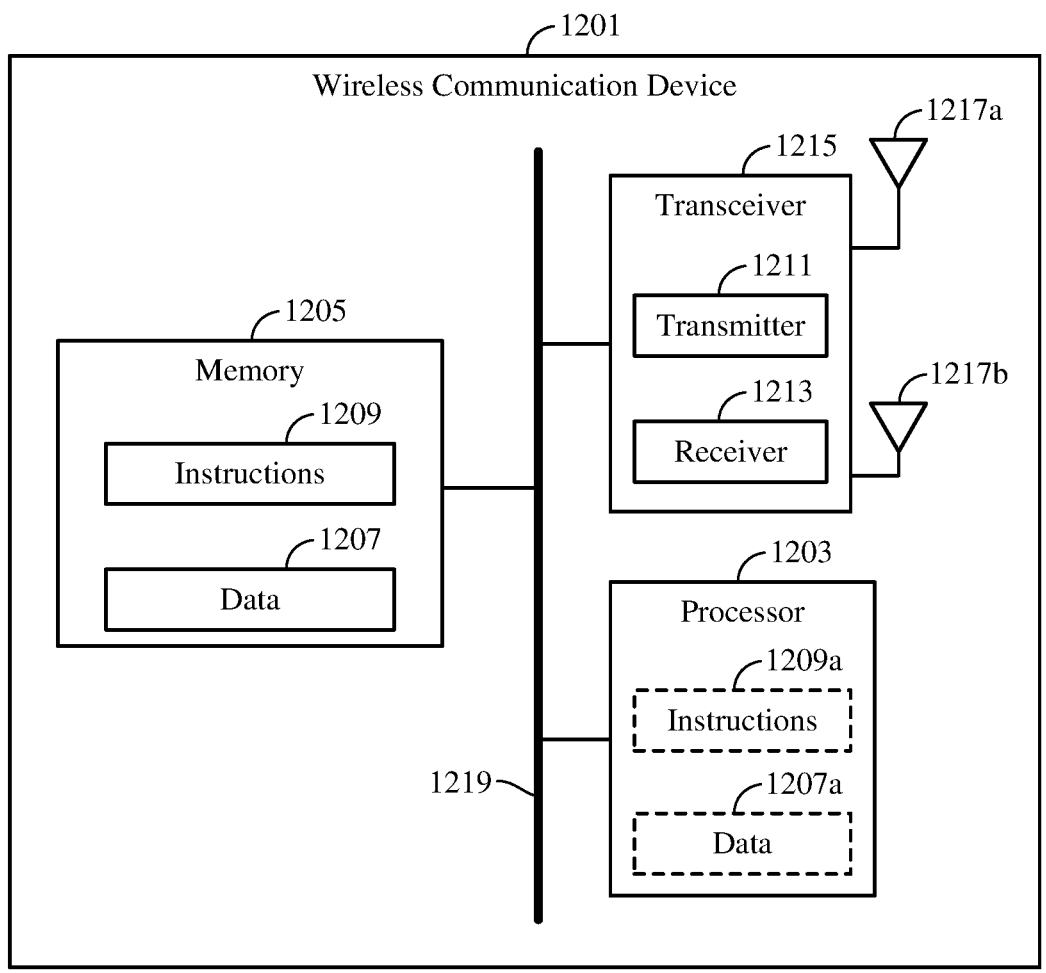
FIG. 12 illustrates certain components that may be included within a wireless communication device.

FIG. 12 illustrates certain components that may be included within a wireless communication device 1201. The wireless communication device 1201 may be an access terminal, a mobile station, a user equipment (UE), etc. The wireless communication device 1501 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1201 of FIG. 11, in an alternative configuration, a combination of processors (e.g., an ARM and DSP) could be used.

The wireless communication device 1201 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1503 executes the instructions 1209, various portions of the instructions 1209a may be loaded onto the processor 1203, and various pieces of data 1507a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. Multiple antennas 1217a-b may be electrically coupled to the transceiver 1215. The wireless communication device 1201 may also include (not shown) multiple transmitters, multiple receivers and/or multiple transceivers.

The various components of the wireless communication device 1201 may be coupled together by one or more buses, which may include a power bus, a control signal bus, a status signal bus, a data bus, etc. For the sake of clarity, the various buses are illustrated in FIG. 12 as a bus system 1219. It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for receiving on transmit and transmitting on receive.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 IX, IX, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for receiving on transmit and transmitting on receive. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of monitoring paging occasions on unlicensed spectrum, comprising:
defining, at a user equipment (UE), a paging frame window (PFW) for a duration of time on a hop frequency or narrow band of frequencies indicated by a paging formula, wherein defining the PFW comprises determining an identifier based on the paging formula and, after determining the identifier, modifying at least one bit of the identifier to a fixed bit value, the identifier mapping to the hop frequency or one of the narrow band of frequencies; and
periodically waking up the UE to monitor the PFW for a page message received on the unlicensed spectrum.

2. The method of monitoring paging occasions according to claim 1, wherein the PFW is monitored for a duration of a dwell time per hop on each frequency.

3. The method of monitoring paging occasions according to claim 1, wherein the PFW is monitored for a duration of N frames.

4. The method according to claim 3, comprising:
receiving a frame structure information at the start of at least one frame, wherein the at least one frame of one hop frequency has at least one downlink-uplink transition.

5. The method according to claim 4, wherein the frame structure is dynamic.

6. The method according to claim 3, further comprising:
monitoring a longest continuous downlink subframe duration within a frame of the PFW for the paging occasions.

7. The method according to claim 3, further comprising: monitoring all downlink subframes in each downlink portion of a frame of the PFW.

8. The method according to claim 3, wherein a subframe where the UE starts monitoring paging is uniquely defined for each frame structure.

9. The method according to claim 1, wherein a formula used to select the hop frequency is the paging formula used to calculate a paging frame.

10. The method according to claim 9, wherein the paging formula used to select the hop frequency is
SFN mod T=(T/N)*(UE_ID mod N), wherein T is a duration of an extended discontinuous reception (eDRX) cycle, wherein N is a number of frames, and wherein UE_ID is an identifier of the UE.

11. The method according to claim 1, wherein the PFW is monitored over the narrow band of frequencies.

12. The method according to claim 11, wherein the narrow band of frequencies is dynamic.

13. The method of claim 1, wherein an eDRX cycle is either cell-specific or UE specific.

14. The method of monitoring paging occasions according to claim 1, further comprising:
adding at least one additional high priority message to be carried in the paging message.

15. The method according to claim 14, wherein the at least one additional high priority message includes changing of at least one frequency hopping list including a number of hopping channels.

16. The method according to claim 14, wherein the at least one additional high priority message includes changing of anchor channel information used for DRS transmissions.

17. The method of monitoring paging occasions according to claim 1, further comprising:
reading an information block which indicates at least one of whether paging is present in a frame, and control format to be assumed for paging:
decoding a physical downlink shared channel (PDSCH) scrambled with paging-radio network temporary identifiers (P-RNTI) to receive the paging message if the paging message is present; and
skipping the frame if the paging message is not present.

18. The method of claim 1, wherein the fixed bit value is zero.

19. The method of claim 1, wherein modifying the at least one bit comprises modifying three least significant bits of the identifier.

20. The method of claim 1, wherein modifying the at least one bit comprises modifying two least significant bits of the identifier.

21. The method of claim 1, wherein a number of bits of the at least one bit are based on a carrier frequency.

22. A wireless communication device to monitor paging occasions on unlicensed spectrum, comprising:
a memory;
a radio frequency (RF) resource; and
a processor coupled to the memory and the RF resource, the processor configured to:
define, at a user equipment (UE), a paging frame window (PFW) for a duration of time on a hop frequency or narrow band of frequencies indicated by a paging formula, wherein defining the PFW comprises determining an identifier based on the paging formula and, after determining the identifier, modifying at least one bit of the identifier to a fixed bit value, the identifier mapping to the hop frequency or one of the narrow band of frequencies; and
periodically wake up the UE to monitor the PFW for a page message received on the unlicensed spectrum.

23. The wireless communication device of claim 22, wherein the PFW is monitored for a duration of a dwell time per hop on each frequency.

24. The wireless communication device of claim 22, wherein the PFW is monitored for a duration of N frames.

25. The wireless communication device according to claim 24, comprising:
receiving frame structure information at the start of at least one frame, wherein the at least one frame of one hop frequency has at least one downlink-uplink transition.

26. The wireless communication device according to claim 25, wherein the frame structure is dynamic.

27. The wireless communication device of claim 22, wherein a formula used to select the hop frequency is the paging formula used to calculate a paging frame.

28. The wireless communication device according to claim 27, wherein the paging formula used to select the hop frequency is
SFN mod T=(T/N)*(UE_ID mod N), wherein T is a duration of an extended discontinuous reception (eDRX) cycle, wherein N is a number of frames, and wherein UE_ID is an identifier of the UE.

29. A wireless communication device to monitor paging occasions on unlicensed spectrum, comprising:
means for defining, at a user equipment (UE), a paging frame window (PFW) for a duration of time on a hop frequency or narrow band of frequencies indicated by a paging formula, wherein defining the PFW comprises determining an identifier based on the paging formula and, after determining the identifier, modifying at least one bit of the identifier to a fixed bit value, the identifier mapping to the hop frequency or one of the narrow band of frequencies; and
means for periodically waking up the UE to monitor the PFW for a page message received on the unlicensed spectrum.

30. A non-transitory processor-readable storage medium having stored thereon processor-executable instructions configured to cause a processor of a mobile communication device to monitor paging occasions on unlicensed spectrum by performing operations comprising:
defining, at a user equipment (UE), a paging frame window (PFW) for a duration of time on a hop frequency or narrow band of frequencies indicated by a paging formula, wherein defining the PFW comprises determining an identifier based on the paging formula and, after determining the identifier, modifying at least one bit of the identifier to a fixed bit value, the identifier mapping to the hop frequency or one of the narrow band of frequencies; and
periodically waking up the UE to monitor the PFW for a page message received on the unlicensed spectrum.

* * * * *